3,102,905
PROCESS FOR PREPARING TERTIARY BUTYL ACETATE

Edward N. Wheeler, Duane L. Stearns, Bruce A. Melaas, and Peter P. Gesting, all of Corpus Christi, Tex., assignors to Celanese Corporation of America, New York, N.Y., a corporation of Delaware
No Drawing. Filed Oct. 30, 1959, Ser. No. 849,722
14 Claims. (Cl. 260—497)

This invention relates to the production of esters and relates particularly to the production of t-butyl acetate.

It is an object of this invention to provide an improved method for the reaction of olefins and carboxylic acids.

Another object of this invention is the provision of a method for reacting isobutylene and acetic acid to obtain high yields of t-butyl acetate.

Other objects will be apparent from the following detailed description and claims. In this description and clams all proportions are by weight unless otherwise indicated.

In accordance with one aspect of this invention isobutylene and acetic acid are reacted in liquid phase in the presence of a catalytic proportion of a dissolved organic sulfonic acid. We have found that the organic sulfonic acids, in which the $SO_3H$ group is directly attached to a carbon atom are particularly good catalysts for this reaction. They have little, if any, tendency to oxidize or polymerize the components of the reaction mixture and are not highly corrosive. Especially good catalysts are the aromatic sulfonic acids such as benzene sulfonic acid or any of the toluene sulfonic acids. Examples of other organic sulfonic acids are heterocyclic sulfonic acids, such as pyridine sulfonic acid, and aliphatic sulfonic acids such as the alkyl sulfonic acids, e.g. butane sulfonic acid or cyclohexane sulfonic acid.

The reaction between the isobutylene and acetic acid is best effected in the presence of an excess of either reactant, e.g. by supplying an amount of acetic acid in the range of about 10 to 0.5 moles, per mole of isobutylene, but it is advantageous to use an excess of acetic acid; preferably the amount of acetic acid is about 1.5 to 3 moles, per mole of isobutylene. The preferred reaction temperature is in the range of about 10 to 120° C., a temperature within the range of about 50 to 90° C. being especially suitable. Advantageously the concentration of catalyst is low, e.g. in the range of about 0.02 to 5%, preferably about 0.1 to 0.5%, based on the weight of the entire reaction mixture, and the time of reaction is in the range of about 0.1 to 10 hours, preferably about 0.5 to 2 hours.

In accordance with another aspect of this invention, the crude reaction mixture, containing t-butyl acetate, acid catalyst and unreacted isobutylene and acetic acid, is fed into a mass of boiling acetic acid in a fractional distillation zone. This may be done by feeding the crude mixture into a fractionating column at a point where the contents of the column are predominately boiling acetic acid. Advantageously the column is operated at about atmospheric pressure and the point to which the reaction mixture is fed is at a temperature of about 110 to 118° C., preferably about 115 to 117° C. If desired the fractionating column can be operated at a subatmospheric pressure, e.g. down to 100 mm. Hg A but this would generally require a larger column and would make it more difficult to recover the unreacted isobutylene in a suitable form. We have found that heating a reaction mixture containing unneutralized acid catalyst, in an attempt to distill off the tertiary butyl acetate, results in very extensive decomposition. However, when the same reaction mixture is fed to a distillation zone containing predominately boiling acetic acid the amount of decomposition is greatly diminished. While we do not wish to be bound by any particular explanation, we believe that this result is caused, at least in part, by the rapid distillation of the t-butyl acetate from the catalyst-containing feed zone coupled with considerable dilution of the catalyst by the mass of boiling acetic acid. The use of a relatively low concentration of catalyst in the reaction mixture also contributes to this result. Advantageously the rate of feed of the reaction mixture is such, in relation to the amount of boiling acetic acid maintained in the distillation column, that the concentration of acetic acid in the liquid in the column at the level of the feed point is at least about 85%, preferably at least about 97%. The temperature of the reaction mixture fed to the column is desirably at or below the reaction temperature, specified previously. While the aspect of the invention here described is particularly suitable when the catalyst is an aromatic sulfonic acid, it also may be usefully applied to reaction mixtures containing other dissolved esterification catalysts which are not volatile under the distillation conditions, e.g. sulfuric acid or phosphoric acid.

Another aspect of this invention relates to the conditions under which the fractionating column operates. As stated, the t-butyl acetate distils rapidly from the feed zone. The catalyst, mixed with acetic acid is withdrawn from the base; we have found that this mixture can be recycled without further treatment (or with removal of small amounts of impurities, if desired) to the esterification zone to which there are also supplied fresh acetic acid and isobutylene. Because recycling of the catalyst, without neutralization, is feasible in our process there are considerable economic advantages; furthermore there is no buildup of undesirable sludge of neutralized catalyst in the recycled acetic acid. Turning now to the volatile materials, we have discovered that it is advantageous to operate the distillation column under substantially total reflux of isobutylene dimer (formed in the reaction) and t-butyl acetate, while allowing isobutylene to leave, uncondensed, for recycle to the esterification zone; the t-butyl acetate is taken off from the column as a liquid sidestream. We have found that taking the product as a sidestream, rather than overhead, results in a reduction in the isobutylene content of the product. Conveniently the sidestream is taken off at a temperature of about 90 to 97° C., at atmospheric pressure.

When the t-butyl acetate is to be used as an additive in leaded gasoline (where it acts to increase the octane number), it is desirable that its acetic acid content be quite low (e.g. not above 0.01% acid as acetic acid). We have found that we can obtain a product side-stream of the desired low acetic acid concentration by maintaining sufficient t-butyl alcohol in the distillation column to form a low boiling azeotrope with the isobutylene dimer; this azeotrope contains about 63% t-butyl alcohol and boils at about 80° C. at atmospheric pressure. We believe that the presence of t-butyl alcohol acts to reduce the acetic acid concentration by tying up the isobutylene dimer in the aforesaid low boiling azeotrope and thereby preventing this dimer from forming with the acetic acid an azeotrope boiling below the boiling point of t-butyl acetate. We have found that the latter azeotrope, which boils at about 94–95° C., acts, in the absence of the t-butyl alcohol, to carry acetic acid into the product. The necessary amount of t-butyl alcohol to form this azeotrope is conveniently introduced into the mixture by including a small proportion of water in the reaction mixture so as to convert a part of the isobutylene to t-butyl alcohol. With atmospheric pressure operation, the amount of water should be such, in relation to the amount of isobutylene dimer present in the system, as to provide a ratio of t-butyl alcohol to isobutylene dimer of at least 1.7 to 1 by weight in the column. Additional amounts of water are wasteful of isobutylene and it is therefore desirable that the proportion of water, and the resulting proportion of t-butyl alcohol, be no more than about 150% of the amount necessary to form the azeotrope of the dimer and t-butyl alcohol. Generally for each gram water per 100 grams isobutylene fed to the reaction zone about 3 grams isobutylene are converted to t-butyl alcohol. The t-butyl alcohol may also be formed, if desired, by adding water to the column. The sidestream of t-butyl acetate also contains the isobutylene dimer and the t-butyl alcohol; these can be removed by a simple distillation. If desired, the dimer-alcohol azeotrope may be removed as a vapor at a higher point on the column; in that case the t-butyl acetate side stream is of higher purity.

In accordance with another aspect of this invention, isobutylene vapors are continuously introduced into an absorber, which may be in the form of a tower, which is suitably packed or which contains a number of trays, as is well known in the absorber art. The isobutylene is introduced at, or near, the base of the absorber while acetic acid and the catalyst are continuously fed to the upper part of the absorber. The liquid reaction products are taken off continuously from the base of the absorber, while unreacted gases or vapors are taken off continuously from the top. This system is particularly suitable for use with mixed butylene streams which may contain only minor proportions (e.g. about 15–40%) of isobutylene. The reaction temperatures and catalyst concentrations may be those previously set forth. We have found that we can react the isobutylene without any appreciable reaction of the 1- and 2-butene. In the absorber the dissolved isobutylene at any one point is in equilibrium with the isobutylene in the mixed butylene vapor. This equilibrium is continuously displaced as the dissolved isobutylene reacts with the acetic acid to form t-butyl acetate. In this manner almost all the isobutylene may be recovered from the mixed butylene stream. The absorber may be operated under very moderate pressure, e.g. a base pressure of about 15–40 p.s.i.g.

By the practice of this invention we have been able to obtain t-butyl acetate in a very efficient manner and in a highly pure state.

The following examples are given to illustrate this invention further.

*Example I*

An esterification mixture, comprising 560 parts of isobutylene, 900 parts of acetic acid, 4.5 parts of benzene sulfonic acid and 2.6 parts of water are reacted at a temperature of 75° C. under the pressure which drops from 102 p.s.i.g. to 50 p.s.i.g. during the reaction, for 3 hours. The resulting liquid reaction mixture is then fed continuously to the 10th tray of a 55 tray distillation column containing boiling acetic acid and operating at atmospheric pressure. The temperature of the column at the feed point is 115–117° C. The vapors leaving from the top of the column, except the isobutylene, are condensed, in a condenser at a temperature of 25–40° C., and returned to the top of the column; isobutylene in said vapors passes, as vapor, through said condenser. A liquid sidestream of t-butyl acetate is taken off continuously at the 50th tray at a temperature of 96–97° C. From the base of the column, at a temperature of 120° C., there is removed continuously a stream containing acetic acid and benzene sulfonic acid. The base stream and the isobutylene taken overhead are recycled to the esterification zone, together with fresh isobutylene and acetic acid, to form the esterification mixture described previously.

The reaction mixture from the esterification zone contains 41% acetic acid, 40% t-butyl acetate, 18% isobutylene, 0.2% isobutylene dimer, 0.7% t-butyl alcohol, and 0.3% benzene sulfonic acid. Some of the isobutylene is allowed to flash off before the mixture enters the column. The product sidestream contains 98.9% t-butyl acetate, 0.5% t-butyl alcohol, 0.4% isobutylene dimer, 0.004% acetic acid and 0.2% of isobutylene.

*Example II*

100 parts per hour of a mixture of butylenes containing 25% isobutylene, 40% n-butenes and 35% butanes is compressed to 30 p.s.i.g. and fed to the base of a 70-tray flooded absorption tower. 160 parts per hour of acetic acid containing 0.35% benzenesulfonic acid and 0.15% water is fed to the top of the tower. The residence time of the acetic acid in the tower is 90 minutes.

The temperature at the base of the tower is 75° C.; at the top of the tower it is 50° C. The top of the tower is at atmospheric pressure. From the base of the tower there is withdrawn an acetic acid solution of t-butyl acetate, while from the top of the tower there is withdrawn butane and butylene vapors very low in isobutylene. These vapors may be purified, for recovery, as by compressing them and passing them to a distillation column operating at 160 p.s.i.g.; from the base of this column any acetic acid present in said vapors is recovered for recycling to the absorption tower. The t-butyl acetate is recovered from the base stream of the absorption tower by passing said base stream directly to a distillation column operated under the conditions set forth in Example I.

It is to be understood that the foregoing detailed description is given merely by way of illustration and that many variations may be made therein without departing from the spirit of our invention.

Having described our invention what we desire to secure by Letters Patent is:

1. Process for the recovery of t-butyl acetate from an esterification reaction mixture containing said t-butyl acetate, acetic acid isobutylene, isobutylene dimer and an esterification catalyst, which comprises feeding said reaction mixture into a mass of boiling acetic acid at an intermediate point on a fractional distillation column, taking off a residue of acetic acid containing said catalyst from said column below said intermediate point, taking t-butyl acetate and isobutylene dimer overhead and refluxing said overhead back to said column, maintaining in said column a proportion of t-butyl alcohol sufficient to form an azeotrope with isobutylene dimer in said column, and taking off t-butyl acetate from said column above said feed point.

2. Process as set forth in claim 1 in which said t-butyl acetate is taken off as a liquid sidestream from said column.

3. Process for the separation of t-butyl acetate from a mixture thereof with acetic acid isobutylene dimer and isobutylene, which comprises fractionally distilling said mixture in a distillation column at a temperature sufficient to boil acetic acid and containing a proportion of t-butyl alcohol sufficient to form an azeotrope with said isobutylene dimer taking off a residue of acetic acid from said column, refluxing back to said column substantially all the t-butyl acetate and isobutylene dimer coming overhead from said column, withdrawing the isobutylene overhead, and taking off a sidestream of liquid t-butyl acetate.

4. Process for the separation of t-butyl acetate from a mixture thereof with acetic acid, isobutylene dimer and isobutylene, which comprises fractionally distilling said mixture in a distillation column at a temperature sufficient to boil acetic acid, taking off a residue of acetic acid from said column, refluxing back to said column substantially all the t-butyl acetate and diisobutylene coming overhead from said column, withdrawing the isobutylene overhead, and taking off a sidestream of liquid t-butyl acetate, while maintaining in said column a proportion of t-butyl alcohol sufficient to form an azeotrope with all the isobutylene dimer in said column.

5. Process for the recovery of t-butyl acetate from an esterification reaction mixture containing said t-butyl acetate, acetic acid, isobutylene, isobutylene dimer and an acid esterification catalyst, which comprises feeding said reaction mixture into a mass of boiling acetic acid at an intermediate point on a fractional distillation column, taking off a residue of acetic acid containing said catalyst from said column below said intermediate point, refluxing back to said column substantially all the t-butyl acetate and isobutylene dimer coming overhead from said column, withdrawing the isobutylene overhead, and taking off a sidestream of liquid t-butyl acetate while maintaining in said column a proportion of t-butyl alcohol sufficient to form an azeotrope with all the isobutylene dimer in said column.

6. Process for the production of purified t-butyl acetate, which comprises reacting isobutylene and about 0.5 to 10 moles of acetic acid per mole of isobutylene in liquid phase in the presence of about 0.02 to 5% of dissolved aromatic sulfonic acid as an esterification catalyst for about 0.1 to 10 hours, feeding the resulting reaction mixture, comprising acetic acid, isobutylene, diisobutylene and t-butyl acetate, into a mass of boiling acetic acid at an intermediate point on a fractional distillation column, taking off a residue of acetic acid containing said catalyst from said column below said intermediate point, refluxing back to said column substantially all the t-butyl acetate and isobutylene dimer coming overhead from said column, withdrawing the isobutylene overhead, and taking off a sidestream of liquid t-butyl acetate while maintaining in said column a proportion of t-butyl alcohol sufficient to form an azeotrope with all the isobutylene dimer in said column.

7. Process for the production of purified t-butyl acetate, which comprises reacting isobutylene and about 1.5 to 3 moles of acetic acid per mole of isobutylene in liquid phase in the presence of about 0.1 to 0.5% of dissolved aromatic sulfonic acid as an esterification catalyst for about 0.5 to 2 hours, feeding the resulting reaction mixture comprising acetic acid, isobutylene, diisobutylene and t-butyl acetate, into a mass of boiling acetic acid at an intermediate point on a fractional distillation column, taking off a residue of acetic acid containing said catalyst from said column below said intermediate point, refluxing back to said column substantially all the t-butyl acetate and isobutylene dimer coming overhead from said column, withdrawing the isobutylene overhead, and taking off a sidestream of liquid t-butyl acetate while maintaining in said column a proportion of t-butyl alcohol sufficient to form an azeotrope with all the isobutylene dimer in said column, and recycling the catalyst-containing acetic acid and the isobutylene from said column to said reaction.

8. Process for the production of t-butyl acetate which comprises passing a stream of vapors of isobutylene continuously through an absorption zone where said vapors come into countercurrent contact with a stream of liquid acetic acid containing a catalyst which catalyzes the reaction of isobutylene and acetic acid to form t-butyl acetate, to continuously absorb said isobutylene in said liquid and to continuously produce t-butyl acetate, and continuously withdrawing a solution of t-butyl acetate in acetic acid from said zone, said solution being fed into a distillation zone at a temperature sufficient to boil acetic acid and containing sufficient t-butyl alcohol to form an azeotrope with isobutylene dimer, taking off a residue comprising acetic acid from said distillation zone, taking t-butyl acetate and isobutylene dimer overhead and recycling such back to said distillation zone, taking liquid t-butyl acetate as a side-stream, and withdrawing isobutylene overhead.

9. Process as set forth in claim 8 in which said catalyst is a dissolved aromatic sulfonic acid.

10. Process as set forth in claim 9 in which said stream of isobutylene vapors is a mixture of butenes containing a major proportion of 1-butene and 2-butene, and butane.

11. Process as set forth in claim 8 and comprising the further steps of feeding said withdrawn solution into a mass of boiling acetic acid and distilling off said t-butyl acetate, said catalyst being non-volatile at the temperature of said boiling acetic acid.

12. Process as set forth in claim 10, in which said withdrawn solution contains isobutylene dimer and isobutylene, said process comprising feeding said withdrawn solution into a mass of boiling acetic acid at an intermediate point on a fractional distillation column, taking off a residue of acetic acid containing said catalyst from said column below said intermediate point, refluxing back to said column substantially all the t-butyl acetate and isobutylene dimer coming overhead from said column, withdrawing the isobutylene overhead, and taking off a sidestream of liquid t-butyl acetate while maintaining in said column a proportion of t-butyl alcohol sufficient to form an azeotrope with all the isobutylene dimer in said column, but not above about 150% of said azeotropic proportion.

13. Process for the separation of t-butyl acetate from a mixture thereof with acetic acid, isobutylene dimer and isobutylene, which comprises fractionally distilling said mixture in a distillation column containing boiling acetic acid taking off a residue of acetic acid from said column, refluxing back to said column t-butyl acetate and diisobutylene coming overhead from said column, withdrawing the isobutylene overhead, and taking off a sidestream of t-butyl acetate, while maintaining in said column a proportion of t-butyl alcohol sufficient to form an azeotrope with all the isobutylene dimer in said column.

14. Process for the production of t-butyl acetate which comprises absorbing isobutylene into acetic acid, containing a catalyst for the reaction of isobutylene and acetic acid, to produce a mixture containing isobutylene dimer, isobutylene and t-butyl acetate; feeding the reaction mixture to a distillation zone containing sufficient t-butyl alcohol to form an azeotrope with said isobutylene dimer and operating at a temperature sufficient to boil acetic acid; taking acetic acid as a residue stream forming an azeotrope of t-butyl alcohol and isobutylene dimer; taking t-butyl acetate as a side-stream; taking isobutylene overhead; and refluxing t-butyl acetate and isobutylene dimer overhead.

References Cited in the file of this patent

UNITED STATES PATENTS

| 1,877,291 | Frolich et al. | Sept. 13, 1932 |
| 2,041,193 | Lee | May 19, 1936 |
| 2,224,809 | Coleman | Dec. 10, 1940 |
| 2,741,632 | Cottle | Apr. 10, 1956 |

FOREIGN PATENTS

| 882,460 | France | June 4, 1943 |

OTHER REFERENCES

Houben-Weyl: "Die Methoden der Organischen Chemie," "Sauerstoffverbindungen III," 1952, pp. 534–536.